United States Patent Office 3,480,649
Patented Nov. 25, 1969

3,480,649
PREPARATION OF 1,3-DIOXOLENIUM AND
1,3-DIOXENIUM SALTS
Donald A. Tomalia, Midland, Mich., assignor to The
Dow Chemical Company, Midland, Mich., a corporation of Delaware
No Drawing. Filed July 11, 1966, Ser. No. 564,043
Int. Cl. C07d 13/03, 15/04; C07c 69/54
U.S. Cl. 260—340.9                                10 Claims

ABSTRACT OF THE DISCLOSURE

This invention concerns a new process for the preparation of 1,3-dioxolenium and 1,3-dioxenium salts by the cyclization of an organic ester (I) in the presence of certain strong protonic acids (HZ) as shown in Equation 1.

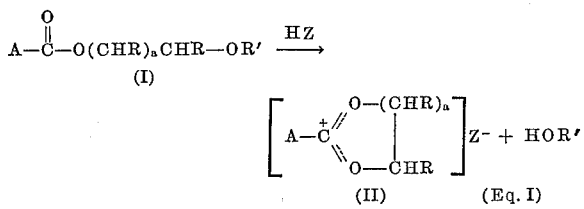

(Eq. I)

The process is applicable to a wide variety of organic esters containing a beta- or gamma-hydroxy-, alkoxy- or carboxyalkyl group

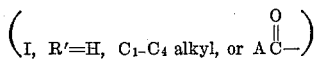

provided that the anion of the salt (Z−) has a low nucleophilicity such as perchlorate, bisulfate or tetrafluoroborate.

BACKGROUND 1,3-dioxolenium salts (II, $a=1$) have been prepared by Meerwein et al. by reacting β-bromoethyl acetate with silver tetrafluoroborate in a non-aqueous medium [Angew, Chemie, 69, 481 (1957)] and by reaction of β-chloroethyl benzoate or β-ethoxyethyl benzoate with antimony pentachloride in methylene chloride [Ann., 632, 38 (1960)]. With a γ-haloalkyl or γ-alkoxyalkyl ester 1,3-dioxenium (II, $a=2$) salts are obtained. However cyclization of β- or γ-hydroxy-, alkoxy- or carboxyalkyl esters (I, $a=1$ or 2) with a strong protonic acid to yield a 1,3-dioxolenium or 1,3-dioxenium salt has not been reported. Such a reaction with sulfuric acid or fluorosulfuric acid has obvious economic and commercial advantages.

It has now been discovered that an organic ester of Formula I:

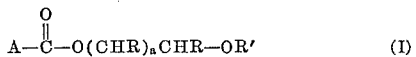

wherein A is an organic group, each R individually is H or a $C_1$–$C_4$ alkyl group, $a$ is 1 or 2, and R′ is H, $C_1$–$C_4$ alkyl or

can be cyclized with a strong acid selected from the group consisting of perchloric, chloric, sulfuric, fluorosulfuric, tetrafluoroboric and hexafluoroantimonic acids, in the presence of not more than about 1 mole of water per mole of acid to form a stable 1,3-dioxolenium or 1,3-dioxenium salt of Formula II:

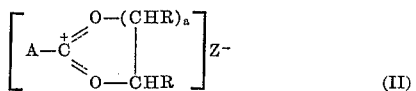

wherein A, R and $a$ are as defined above and Z in the anion of the strong acid. The process is particularly advantageous with β- or γ-hydroxyalkyl esters (I, R′=OH).

These 1,3-dioxolenium or 1,3-dioxenium salts can usually be isolated in a crystalline form, stable at room temperature in the absence of moisture. They react rapidly and often quantitatively with more nucleophilic reagents including HCl, HBr, LiCl, KSCN, NaI, $Na_2SO_3$ and $Na_2S_2O_3$ as well as $NH_3$ and alkyl amines to open the ring and form new esters. Because of this reactivity, these salts are highly useful synthetic intermediates.

The structure of the strong acid is a critical element in this process. Not only is a strong protonic acid required, but its anion (Z−) must be a weak nucleophile to obtain a stable and isolatible 1,3-dioxolenium or 1,3-dioxenium salt. A strong nucleophilic anion such as chloride, bromide, bisulfite or thiosulfate reacts rapidly with the 1,3-dioxolenium or 1,3-dioxenium salt to cleave the ring. Included among suitable acids are perchloric, chloric, sulfuric, fluorosulfuric, tetrafluoroboric, and hexafluoroantimonic acids.

The terms "nucleophile" and "nucleophilicity" are used as defined and illustrated by Roberts and Caserio, "Basic Principles of Organic Chemistry," W. A. Benjamin Inc., New York, 1965, p. 287–291. Essentially these terms reflect the ability of the reagent or ionic species to donate an electron pair to carbon.

The second essential element in the process is a β- or γ-hydroxy-, alkoxy- or carboxyalkyl ester of Formula I:

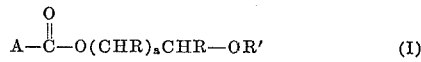

wherein A is an organic group, each R individually is H or a $C_1$–$C_4$ alkyl group, $a$ is 1 or 2, and R′ is H, $C_1$–$C_4$ alkyl or

group. As indicated in Equation I, the 1,3-dioxolenium or 1,3-dioxenium salt is formed by interaction of the ester carbonyl with the β- or γ-substituent group. Esters of the desired structure are readily available. For example they can be prepared by esterification of an organic acid with excess ethylene, propylene or butylene glycol, with 1,3-butanediol, or with a monoalkyl ether of a 1,2- or 1,3-($C_2$–$C_6$) alkylenediol. Reaction of an organic acid with ethylene, propylene or other alkylene oxide also yields suitable β-hydroxyalkyl esters. An allyl ester can be epoxidized and then converted into a hydroxy or alkoxy ester. A polyacrylamide can be partially hydrolyzed and the resulting pendant carboxylic acid groups esterified with excess ethylene glycol or a poly (methyl methacrylate) can be transesterified with ethylene or propylene glycol.

The nature of the organic group (A) is not critical. The process can be used with appropriate esters of a wide variety of organic acids. Particularly suitable are esters of alkyl, alkenyl, cycloalkyl, aryl, alkaryl and polyalkenyl acids. The organic group A can also contain other substituent groups such as halogen, nitro, or amino which are stable under normal reaction conditions.

Typical are esters of acrylic, methacrylic, and α-chloroacrylic acid as well as polymers and copolymers thereof; esters of acetic, fluoroacetic, propionic, succinic, adipic, caproic, cyclopropane carboxylic and phenylacetic acid; esters of saturated and unsaturated aliphatic fatty acids including palmitic, stearic, oleic and linoleic acid; and esters of aromatic acids such as benzoic, phthalic, terephthalic and p-bromobenzoic acid. Also suitable are esters of an acrylic acid (I, $A=CH_2=CB$— wherein B is H, Cl or a $C_1$–$C_4$ alkyl group) or a polymer or copolymer thereof. More specifically the ester can be a polymer containing pendant substituent groups such as shown in Formula III:

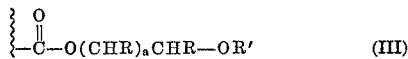

The polymer matrix can be a conventional linear or cross-linked polymer of an ethylenically unsaturated monomer such as an acrylic or vinylaromatic monomer, a methylenediphenyl either polymer or a phenolic resin.

Cyclization of the organic ester (I) to a 1,3-dioxolenium or 1,3-dioxenium salt with a suitable strong acid is conveniently carried out by adding the ester to excess acid at about 0°–50° C. At times a higher temperature may be desirable. But particularly with β- or γ-hyroxyalkyl esters cyclization as followed by nuclear magnetic resonance (NMR) is rapid at room temperature. For example, cyclization of 2-hydroxyethyl methacrylate in 95% $H_2SO_4$ at 20–25° C. is 72 percent complete in 1–2 hours. In fluorosulfuric acid cyclization of the methacrylate at room temperature is essentially complete in 0.25 hour.

The resulting 1,3-dioxolenium and 1,3-dioxenium salts are in most instances crystalline solids, soluble in polar solvents including liquid $SO_2$, and acetonitrile as well as sulfuric acid, fluorosulfuric acid and other acids that can be used in the present process. These salts can often be used without isolation from the acid medium; but when desired, they can usually be isolated by precipitation of an insoluble salt such as a perchlorate by dilution of the acid solution with a suitable liquid precipitant such as ether, n-hexane or toluene.

In the absence of water, the 1,3-dioxolenium and 1,3-dioxenium salts as formed are quite stable in the acid medium or as an isolated solid at room temperature. A small amount of water in the acid medium, e.g. up to about 1 mole per mole of acid (HZ), can usually be tolerated. Larger amounts of water lead to rapid hydrolysis and ring cleavage.

These salts react not only with water but also with a wide variety of other nucleophilic reagents. Thus with ammonia or an alkyl amine, useful aminoalkyl esters are formed. With an inorganic sulfite, sulfoalkyl esters can be prepared. Also if the 1,3-dioxolenium or 1,3-dioxenium salt is appended to a cross-linked polymeric matrix, its reactivity provides a useful new route for adding ion-exchange and other functional groups to the resin.

The following examples illustrate further the present invention. Unless otherwise specified, all parts and percentages are by weight.

Example 1.—Preparation of 2-isopropenyl-1,3-dioxolenium salts (A) To 0.684 part (5.9 mmoles) of fluorosulfuric acid at room temperature was added 0.102 part (0.79 mmoles) of 2-hydroxyethyl methacrylate. A slight exotherm was observed. Formation of the 2-isopropenyl-1,3-dioxolenium salt was essentially complete in 0.25 hr. as shown by nuclear magnetic resonance (NMR). The initial ester had broad peaks at −1.12 p.p.m. characteristic of the α-methyl groups and an unresolved $A_2X_2$ pattern at −4.34 and −3.70 p.p.m. typical of the β-hydroxyethyl group. As cyclization occurred, the peaks shifted downfield and the $A_2X_2$ pattern disappeared with concurrent increase in a broad single absorption at about −5.35 p.p.m. as expected for the more symmetrical cation. The NMR spectrum of the 2-isopropenyl-1,3-dioxolenium salt in fluorosulfuric had a split doublet at −7.03 and −6.66 p.p.m. (vinyl proton), a singlet at −5.45 p.p.m. (ring protons) and a singlet at −2.15 p.p.m. (methyl protons) in a ratio of 2:4:3 respectively.

The structure of the 2-isopropenyl-1,3-dioxolenium fluorosulfate was confirmed by synthesis of 2-isopropenyl-1,3-dioxeluroborate from 2-bromoethyl methacrylate and silver tetrafluoroborate, isolated as a solid, M.P. 155–156.5° C. The NMR spectrum of this purified salt dissolved in fluorosulfuric acid was identical with the product from cyclization of 2-hydroxyethyl methacrylate in fluorosulfuric acid. The infrared spectrum of the salt had strong peaks at 2980–3125 cm.$^{-1}$ (C—H), 1640 cm.$^{-1}$ ($CH_2=C<$), and

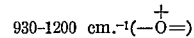

(B) To 0.673 part of 94% $H_2SO_4$ at room temperature was added 0.131 part (1.0 mmole) of 2-hydroxyethyl methacrylate. A slight bubbling and exotherm was observed. Conversion of the 2-hydroxyethyl ester into the 1,3-dioxolenium cation was followed by NMR as described above. Conversion at room temperature was 75% complete in 2.5 hrs. and 87% complete in 48 hrs. The NMR spectrum of the resulting 2-isopropenyl-1,3-dioxolenium bissulfate in $H_2SO_4$ is identical to that of a sample of 2-isopropenyl-1,3-dioxolenium tetrafluroborate prepared by an alternate synthesis and then dissolved in $H_2SO_4$.

Example 2.—Preparation of 2,4-dimethyl-1,3-dioxolenium fluorosulfate

Using the method described in Example 1(A), about 20 parts of a mixture of 1,2-propanediol-1-acetate (73%) and 1,2-propanediol-2-acetate (27%) was dissolved in 80 parts of fluorosulfuric acid at room temperature. A moderate exotherm accompanied by a slight discoloration was observed on initial mixing. The amber brown solution was held at room temperature for an hour and then its NMR spectrum was obtained. The NMR spectrum consisted of a doublet at −1.32 and −1.22 p.p.m. (4-methyl group), a singlet at 2.73 p.p.m. (2-methyl group), and a multiplet at −6.0 to −4.66 p.p.m. (ring protons). This spectrum was essentially identical to that obtained for an authentic sample of a 2,4-dimethyl-1,3-dioxolenium salt prepared by the Meerwein et al. method.

Example 3.—Preparation of 2,5-dimethyl-1,3-dioxenium fluorosulfate

Using the method described in Example 1(A), about 20 parts of 2-methyl-3-hydroxybutyl acetate was dissolved in about 80 parts of fluorosulfuric acid at room temperature. After a moderate exotherm, the solution was held at room temperature for 2 hrs. and then scanned by NMR. The spectrum consisted of a multiplet at −1.05 to −1.32 p.p.m. (5-methyl group) a singlet at −2.75 p.p.m. (2-methyl group) superimposed on a multiplet from −2.33 to −2.93 p.p.m. ($>CH-$ in 5-position), and two doublets centered at −4.45 and −4.77 p.p.m. (ring methylene groups).

Example 4.—Preparation of poly(2-isopropenyl-1,3-dioxolenium fluorosulfate)

About 0.125 part of poly(2-hydroxyethyl methacrylate) was dissolved in 0.610 part fluorosulfuric acid at room temperature and the conversion of the 2-hydroxyethyl ester into the 1,3-dioxolenium cation was followed by NMR. The initial ester had broad peaks at −1.12 p.p.m. (α-methyl group) at −2.05 p.p.m. (polyvinyl matrix) and an unresolved $A_2X_2$ pattern at −4.34 and −3.70 p.p.m. typical of β-hydroxyethyl groups. Treatment with fluorosulfuric acid caused a downfield shift of the signals with the disappearance of the $A_2X_2$ pattern and concurrent increase in a broad single adsorption at −5.55 p.p.m. as expected for the more symmetrical cation. After two hours the spectra was identical to that of the 1,3-dioxolenium salt prepared by reaction of poly(2-bromoethyl methacrylate) and anhydrous silver tetrafluoroborate in methylene chloride and then dissolved in fluorosulfuric acid.

I claim:
1. A process for the production of 1,3-dioxolenium and 1,3-dioxenium salts from an organic β- or γ-hydroxy-, alkoxy- or carboxyalkyl ester which comprises reacting
(1) An organic ester of Formula I:

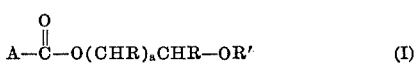  (I)

where

is the acyl group of the organic ester,
each R individually is H or a $C_1$–$C_4$ alkyl group,
$a$ is 1 or 2, and
R' is H, $C_1$–$C_4$ alkyl, or

with
(2) An acid HZ selected from the group consisting of perchloric, chloric, sulfuric, fluorosulfuric, tetrafluoroboric, and hexafluoroantimonic acids,
in the presence of
(3) Not more than 1 mole of water per mole of acid HZ,
to form a 1,3-dioxolenium or 1,3-dioxenium salt of Formula II:

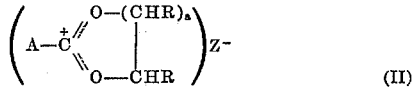  (II)

where the anion Z⁻ is derived from the acid HZ.

2. The process of claim 1 wherein the acid is sulfuric acid.

3. The process of claim 1 wherein the acid is fluorosulfuric acid.

4. The process of claim 1 wherein the ester is a β-hydroxyethyl or β-hydroxypropyl ester of a $C_2$–$C_{18}$ alkyl, alkenyl, cycloalkyl, aryl or alkaryl carboxylic acid.

5. The process of claim 1 wherein the ester has the formula:

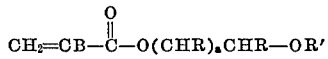

wherein B is H, Cl, or a $C_1$–$C_4$ alkl group.

6. The process of claim 5 wherein the ester is 2-hydroxyethyl methacrylate.

7. The process of claim 1 wherein the ester is a polymer of an ethylenically unsaturated monomer, said polymer containing at least one structural unit of Formula III:

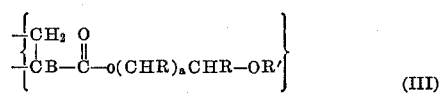  (III)

where B is H, Cl, or $C_1$–$C_4$ alkyl.

8. The process of claim 7 wherein the ester is a poly(2-hydroxyethyl acrylate).

9. The process of claim 1 wherein the ester is reacted with fluorosulfonic acid at 0°–50° C.

10. A process for the preparation of a stable 2-isopropenyl-1,3-dioxolenium salt which consists essentially in dissolving 2-hydroxyethyl methacrylate in sulfuric acid containing less than 1 mole of water per mole of sulfuric acid, maintaining the mixture at 0–50° C. for at least 15 minutes, and thereafter recovering a stable 2-isopropenyl-1,3-dioxolenium salt by precipitation from the sulfuric acid.

References Cited
UNITED STATES PATENTS
3,417,062  12/1969  Tomalia _____ 260—340.9 X

OTHER REFERENCES
Tomalia et al.: "Tetrahedron Letters," 1966 (29), pp. 3389–94.

Hart et al.: "Tetrahedron Letters," 1966 (29), pp. 3383–8.

Magnuson et al.: "Chem. and Ind." (London), 1965 (16), p. 691.

Zaugg et al.: "Tetrahedron," vol. 18 (1962), pp. 893–901.

ALEX MAZEL, Primary Examiner

JAMES H. TURNIPSEED, Assistant Examiner

U.S. Cl. X.R.

260—2.1, 47, 78.5, 79.3, 80.3, 82.1, 86.1, 87.5, 87.7, 88.1, 88.3, 340.7, 410.6, 468, 471, 482, 486, 487